US010286584B2

(12) United States Patent
Sekiguchi

(10) Patent No.: US 10,286,584 B2
(45) Date of Patent: May 14, 2019

(54) INJECTION DEVICE

(71) Applicant: FANUC CORPORATION, Yamanashi (JP)

(72) Inventor: Shoutarou Sekiguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 200 days.

(21) Appl. No.: 15/433,276

(22) Filed: Feb. 15, 2017

(65) Prior Publication Data

US 2017/0239863 A1 Aug. 24, 2017

(30) Foreign Application Priority Data

Feb. 19, 2016 (JP) ................................ 2016-030301

(51) Int. Cl.
*B29C 45/18* (2006.01)
*B29B 13/06* (2006.01)

(52) U.S. Cl.
CPC ............ *B29C 45/18* (2013.01); *B29B 13/065* (2013.01)

(58) Field of Classification Search
CPC .................. B29C 45/18; B29C 13/065; B29C 2045/1875; B29C 31/004; B29C 31/02;
(Continued)

(56) References Cited

U.S. PATENT DOCUMENTS 3,086,244 A * 4/1963 Hehl ...................... B22D 17/18 425/130
3,909,173 A * 9/1975 Latter ..................... B29C 45/10 425/192 R
(Continued)

FOREIGN PATENT DOCUMENTS

CN 203141805 U 8/2013
CN 203510606 U 4/2014
(Continued)

OTHER PUBLICATIONS

An Office Action; "Notification of Reasons for Refusal," mailed by the Japanese Patent Office dated Apr. 10, 2018, which corresponds to Japanese Patent Application No. 2016-030301 and is related to U.S. Appl. No. 15/433,276; with English language translation.
(Continued)

*Primary Examiner* — Joseph S Del Sole
*Assistant Examiner* — Emmanuel S Luk
(74) *Attorney, Agent, or Firm* — Studebaker & Brackett PC

(57) ABSTRACT

An injection device is provided with high convenience by the degrees of freedom in layout of a storage unit and peripheral equipment increasing by way of providing a supply unit with changeable supply direction of molding material. An injection device includes: a hopper that stores a molding material; an injection cylinder unit that heats the molding material to melt, and then injects the molding material thus melted; and a supply unit having formed inside thereof a supply hole for supplying the molding material stored in the hopper to the injection cylinder unit, in which the supply unit is fixed so that a position and orientation of an opening of the supply hole on a side of the hopper is changeable relative to the injection cylinder unit.

5 Claims, 9 Drawing Sheets

(58) Field of Classification Search
CPC .............. B29C 48/684; B29C 48/2567; B29C 48/2563; B29B 13/065
See application file for complete search history.

(56) References Cited

U.S. PATENT DOCUMENTS

| | | | | | |
|---|---|---|---|---|---|
| 4,251,204 | A * | 2/1981 | Hehl | B29C 45/18 | 425/582 |
| 4,266,694 | A | 5/1981 | Hehl | | |
| 4,418,844 | A * | 12/1983 | Hehl | B29C 45/18 | 222/162 |
| 4,418,845 | A | 12/1983 | Hehl | | |
| 4,629,410 | A * | 12/1986 | Hehl | B29C 45/1858 | 222/144.5 |
| 4,889,479 | A * | 12/1989 | Hehl | B29C 31/10 | 425/185 |
| 5,077,019 | A * | 12/1991 | Tatsumi | B29C 31/02 | 137/625.32 |
| 5,148,943 | A * | 9/1992 | Moller | B01F 15/0251 | 177/50 |
| 5,259,749 | A * | 11/1993 | Meixner | B29C 31/02 | 366/151.1 |
| 5,431,554 | A * | 7/1995 | Yoshida | B29C 45/10 | 425/183 |
| 6,461,140 | B1 * | 10/2002 | Bosg | B29C 31/041 | 425/548 |
| 2015/0183149 | A1 * | 7/2015 | Chow | B29C 31/004 | 425/200 |

FOREIGN PATENT DOCUMENTS

| | | | |
|---|---|---|---|
| EP | 0471895 | A1 | 2/1992 |
| EP | 1801049 | A1 | 6/2007 |
| JP | S48-016227 | Y1 | 5/1973 |
| JP | S55-025394 | A | 2/1980 |
| JP | S56-57811 | U | 5/1981 |
| JP | S57-120422 | A | 7/1982 |
| JP | S57-178734 | A | 11/1982 |
| JP | S62-073915 | U | 5/1987 |
| JP | S62-075914 | U | 5/1987 |
| JP | S62-175913 | U | 11/1987 |
| JP | S63-163922 | U | 10/1988 |
| JP | H2-252513 | A | 10/1990 |
| JP | H02-255312 | A | 10/1990 |
| JP | H03-068425 | U | 7/1991 |
| JP | H10-146864 | A | 6/1998 |
| JP | 2001-18255 | A | 1/2001 |
| JP | 2001-293750 | A | 10/2001 |
| JP | 2007-245629 | A | 9/2007 |
| JP | 2011-178083 | A | 9/2011 |
| JP | 2012-35417 | A | 2/2012 |
| JP | 2015-098094 | A | 5/2015 |
| JP | 2017-30189 | A | 2/2017 |

OTHER PUBLICATIONS

An Office Action; "Notification of Refusal," mailed by the Japanese Patent Office dated Jan. 23, 2018, which corresponds to Japanese Patent Application No. 2016-030301 and is related to U.S. Appl. No. 15/433,276; with English translation.

An Office Action mailed by the State Intellectual Property Office dated Oct. 25, 2018, which corresponds to Chinese Patent Application No. 201710081520.3 and is related to U.S. Appl. No. 15/433,276.

* cited by examiner

INJECTION DEVICE

This application is based on and claims the benefit of priority from Japanese Patent Application No. 2016-030301, filed on 19 Feb. 2016, the content of which is incorporated herein by reference.

BACKGROUND OF THE INVENTION

Field of the Invention

The present invention relates to an injection device.

Related Art

Conventionally, an injection device that includes a hopper storing molding material such as resin pellets, and supplies the molding material from this hopper to an injection cylinder unit, has been known as an injection device used in injection molding machines. For example, injection devices that include a hopper applicable to both a horizontal-type injection device and a vertical-type injection device (for example, refer to Patent Document 1), or a hopper in which a waste vent for disposing surplus molding material (for example, refer to Patent Document 2) have been proposed.

Herein, FIG. 8A is a view showing the configuration of a conventional, general injection device 9, and FIG. 8B is a view along the arrow A in FIG. 8A. The injection device 9 is a horizontal-type injection device having an injection cylinder unit 12 that extends in a horizontal direction along the Y axis. The molding material naturally falls down by its own weight from the hopper 91 disposed above the injection cylinder unit 12 to be supplied inside of the injection cylinder unit 12 via the supply unit 93. Between the supply unit 93 and a base end side of the injection cylinder unit 12, a heat control jacket 94 that regulates the heat on the base end side is disposed. A heater 124 is wound around the outer circumference of a cylinder 121, and the molding material is heated to melt by this heater 124. The melted molding material is conveyed by a screw 122 disposed inside of the cylinder 121 until a nozzle 123 at a leading end side, and is injected from the nozzle 123 into a mold of a mold clamping device (not illustrated).

Patent Document 1: Japanese Unexamined Patent Application, Publication No. S55-25394

Patent Document 2: Japanese Unexamined Patent Application, Publication No.2015-98094

SUMMARY OF THE INVENTION

However, with the convention injection device, the supply direction of molding material is limited to one specific direction. More specifically, with a horizontal-type injection device like that shown in FIGS. 8A and 8B, while the supply direction of molding material is limited to vertically downwards along the X axis as shown by the arrow in the drawings, the supply direction of molding material has been limited to obliquely downwards with vertical-type injection devices. For this reason, with the conventional injection device, there is a limitation in the layout of the storage unit storing the molding material such as the hopper and the peripheral equipment, and thus the convenience has been low.

The present invention has an object of providing an injection device with high convenience by the degrees of freedom in the layout of the storage unit and peripheral equipment increasing, by way of including a supply unit that can change the supply direction of molding material.

An injection device (e.g., the injection device 1, 2, 3, 4A, 4B, 5A, 5B, 5C described later) according to the present invention includes: a storage unit (e.g., the hopper 11, 41 described later) that stores a molding material (e.g., the resin pellets described later); an injection cylinder unit (e.g., the injection cylinder unit 12 described later) that heats the molding material to melt, and then injects the molding material thus melted; and a supply unit (e.g., the supply unit 13, 23, 33 described later) having formed inside thereof a supply hole (e.g., the supply hole 131, 331 described later) for supplying the molding material stored in the storage unit to the injection cylinder unit, in which the supply unit is fixed so that at least either of a position and orientation of an opening (e.g., the opening 132, 232, 332 on the hopper side described later) of the supply hole on a side of the storage unit is changeable relative to the injection cylinder unit.

It is preferable for the supply unit to be fixed to be pivotable around a predetermined pivot axis (e.g., the X2 axis described later).

It is preferable for the supply hole to branch inside of the supply unit, and to have at least three openings (e.g., the openings 332, 333, 334 described later).

It is preferable for at least one of the openings to be used as a waste vent of molding material.

The injection device can further include: a heat control unit (e.g., the heat control jacket 14, 24, 44, 54 described later) that is disposed between the supply unit and a base end side of the injection cylinder unit, and controls a temperature of the base end side of the injection cylinder unit.

The storage unit can also be provided to a drying device that dries the molding material or an automatic conveying device that automatically conveys the molding material to the supply unit.

According to the present invention, it is possible to provide an injection device with high convenience by the degrees of freedom in the layout of the storage unit and peripheral equipment increasing, by way of including a supply unit that can change the supply direction of molding material.

DETAILED DESCRIPTION OF THE INVENTION

Hereinafter, a first embodiment of the present invention will be explained in detail while referencing the drawings. It should be noted that, in the explanations of a second embodiment and after, the same reference symbols will be assigned for configurations shared with the first embodiment, and explanations thereof will be omitted.

First Embodiment

Figure 1:
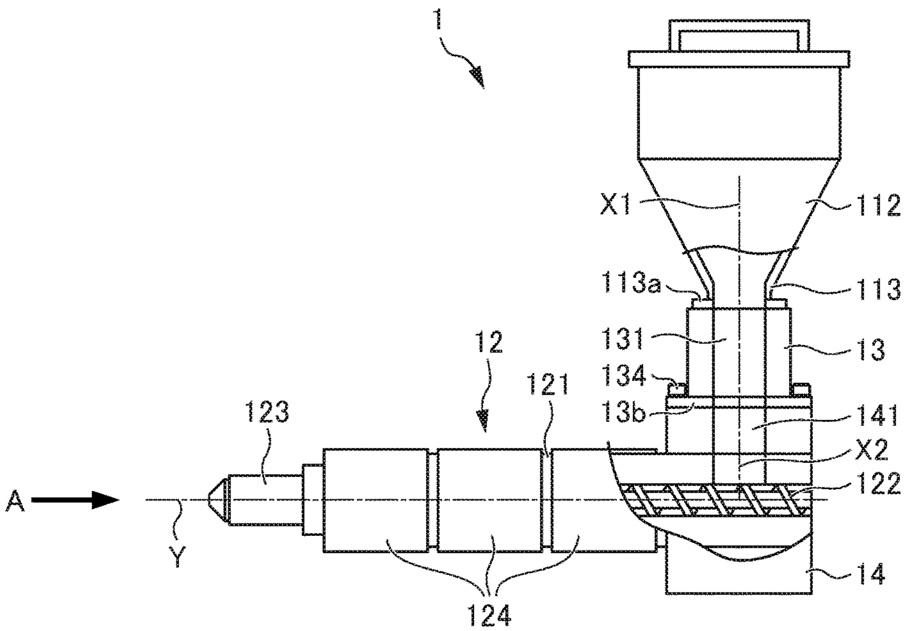
FIG. 1 is a view showing the configuration of an injection device according to a first embodiment.
Figure 2A:
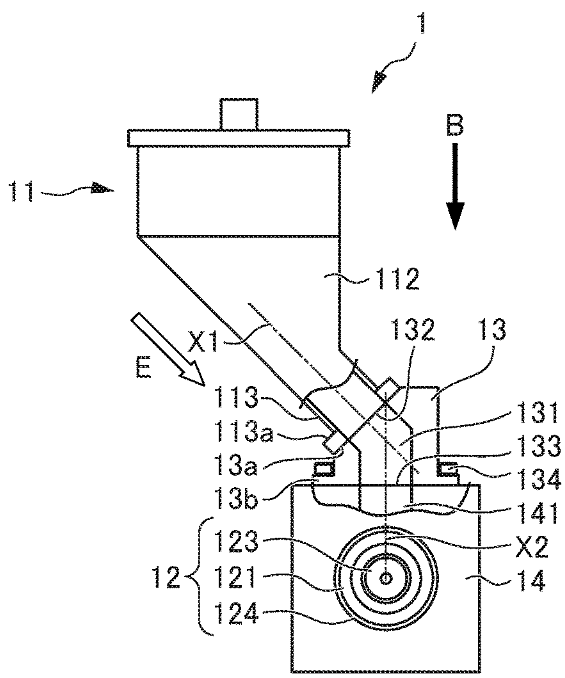
FIG. 2A is a view along the arrow A in FIG. 1.

FIG. 1 is a view showing the configuration of an injection device 1 according to the first embodiment of the present invention. FIG. 2A is a view along the arrow A in FIG. 1.

The injection device 1 according to the first embodiment is used as an injection device of an injection molding machine including a mold clamping device (not illustrated) that clamps the mold and molds a resin article. The injection device 1 is a horizontal-type injection device in which an injection cylinder unit 12 described later extends in a horizontal direction along the Y axis (left/right direction in FIG. 1). The injection device 1 heats resin pellets as the molding material to form molten resin, and injects this molten resin inside the mold of the mold clamping device.

The injection device 1 includes a hopper 11, injection cylinder unit 12, supply unit 13, and heat-control jacket 14.

The hopper 11 accommodates and stores the molding material inside thereof. In the hopper 11, a lower part 112 has a vertically inverted slanted cone shape, and a leg part 113 is connected at the lower end thereof. The leg part 113 is provided to extend obliquely downwards, and a flange 113*a* formed at the bottom end thereof is connected to an oblique face part 13*a* of the supply unit 13 described later. As shown in FIG. 2A, the hopper 11 is thereby not just above the supply unit 13 and heat control jacket 14, but rather is arranged at a position displaced in the horizontal direction which is orthogonal to the Y axis, which is a central axis of the injection cylinder unit 12 (position displaced to left side from Y axis in FIG. 2A).

The injection cylinder unit 12 heats resin pellets that are the molding material to make molten resin, and injects this molten resin into the mold of the mold clamping device. The injection cylinder unit 12 is provided to extend in the horizontal direction along the Y axis, which is the central axis thereof. The injection cylinder unit 12 is configured to include a cylinder 121, a screw 122, a nozzle 123 and a heater 124.

The cylinder 121 has a cylindrical shape and extends in the Y-axis direction. The screw 122 described later is accommodated inside of the cylinder 121, and the molding material is supplied to the base end side thereof. The screw 122 is arranged concentrically within the cylinder 121. The screw 122 has helical blades on the outer circumference thereof. The screw 122 rotates by way of a rotating servo motor (not illustrated) with the Y axis as the axis of rotation, and moves inside of the cylinder 121 in the Y-axis direction by way of an injection servo motor (not illustrated). The molten resin inside of the cylinder 121 is thereby conveyed to the nozzle 123 described later.

The nozzle 123 is arranged at a leading end of the cylinder 121. The nozzle 123 discharges the molten resin within the cylinder 121 into the mold of the mold clamping device by way of the screw 122.

The heater 124 is wound around the outer circumferential face of the cylinder 121. The heater 124 heats resin pellets inside of the cylinder 121 to make molten resin.

The supply unit 13 is arranged between the hopper 11 and the heat control jacket 14 described later. The supply unit 13 supplies the molding material stored in the hopper 11 to the injection cylinder unit 12. The supply unit 13 is a substantially quadrangular prism shape, and has, at an upper part thereof, an oblique face part 13*a* connected to the bottom end flange 113*a* of the leg 113 of the hopper 11. The oblique face part 13*a* functions as a connecting face part with the hopper 11. In addition, the supply unit 13 has a flange 13*b* at a lower part thereof, and comes to be fixed by bolts 134 being fastened in bolt holes formed in this flange 13*b* and in bolt holes formed in the upper face of the heat control jacket 14 described later.

A supply hole 131 for supplying molding material to the injection cylinder unit 12 is formed at the inside of the supply unit 13. The supply hole 131 is formed to penetrate the inside of the supply unit 13. In more detail, the supply hole 131 extends obliquely downwards from an opening 132 on the hopper side formed in the oblique face part 13*a*, then curves and extends vertically downwards to reach an opening 133 on the heat control jacket side. In addition, this supply hole 131 is connected to an introducing hole 141 of the heat control jacket 14 described later.

In the present embodiment, the central axis of a portion of the supply hole 131 extending obliquely downwards is the X1 axis, which matches the central axis of the leg of the hopper 11, and the central axis of a portion extending vertically downwards is the X2 axis (vertical axis), which matches the central axis of the introducing hole 141. In addition, this X1 axis and X2 axis are intersecting each other. However, it is not limited thereto, and the central axis may deviate from each other.

The heat control jacket 14 is arranged between the supply unit 13 and the base end side of the injection cylinder unit 12. The heat control jacket 14 adjusts the temperature at the base end side of the injection cylinder unit 12. The base end side of the cylinder 121 is inserted inside of the heat control jacket 14. In addition, the introducing hole 141 connected to the supply hole 131 of the supply unit 13 and for introducing the molding material into the cylinder 121 is formed inside of the heat control jacket 14. A cooling passage (not illustrated) in which a cooling medium circulates is formed inside of the heat control jacket 14, whereby the base end side of the injection cylinder unit 12 heated by the heater 124 is cooled to be temperature controlled.

In the injection device 1 equipped with the above configuration, the supply unit 13 is fixed to the heat control jacket 14 to be able to pivot with the X2 axis (vertical axis) as a pivot axis. In other words, the position and orientation of the opening 132 on the hopper side of the supply hole 131 formed in the supply unit 13 are changed relative to the injection cylinder unit 12, by removing the bolts 134, temporarily detaching the supply unit 13 from the heat control jacket 14, pivoting around the X2 axis (vertical axis), and then fixing again by the bolts 134. The injection device 1 thereby becomes able to change the supply direction of molding material.

Figure 2B:
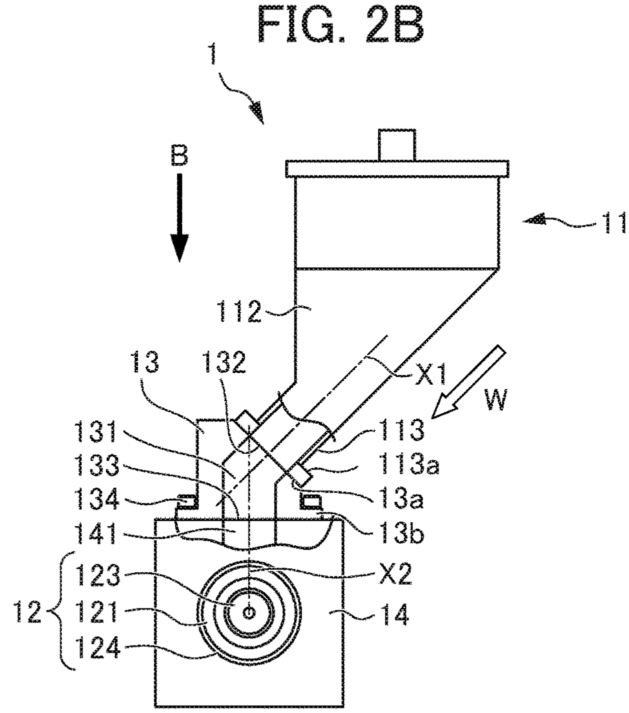
FIG. 2B is a view showing the injection device according to the first embodiment, when changing a supply direction of a molding material.

Herein, FIG. 2B is a view showing the injection device 1 when changing the supply direction of molding material. More specifically, FIG. 2B shows the injection device 1 when pivoting the supply unit 13 by 180 degrees around the X2 axis (vertical axis) and then fixing. As shown in FIG. 2B, the supply direction of the molding material indicated by the arrow in the drawing also pivots by 180 degrees, by causing the supply unit 13 to pivot by 180 degrees around the X2 axis (vertical axis). In other words, prior to pivoting of the supply unit 13, the supply direction of molding material was the E direction (obliquely downwards to right in FIG. 2A), as shown in FIG. 2A; whereas, after pivoting by 180 degrees of the supply unit 13, it is changed to the W direction (obliquely downwards to left in FIG. 2B) as shown in FIG. 2B.

Figure 3:
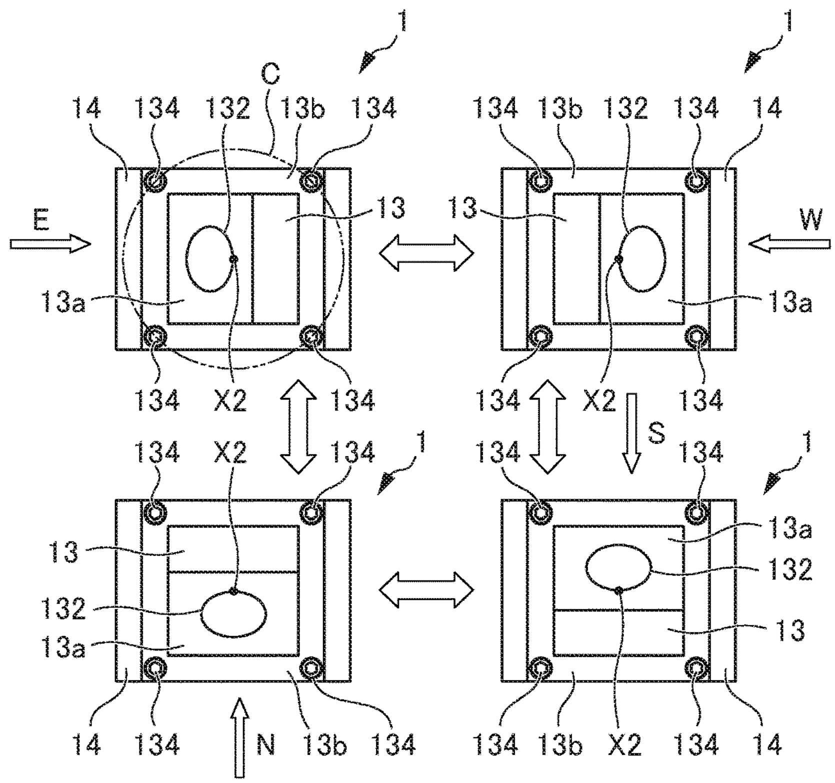
FIG. 3 is a view illustrating a changing operation of the supply direction of molding material for the injection device according to the first embodiment.

The changing operation of the supply direction of molding material for the injection device 1 will be explained in further detail by referencing FIG. 3. Herein, FIG. 3 is a view illustrating the changing operation of the supply direction of the molding material for the injection device 1. More specifically, FIG. 3 is a plan view of the injection device 1, with the upper left in FIG. 3 showing a view along the B arrow in FIG. 2A, and the upper right in FIG. 3 showing a view along the B arrow in FIG. 2B. It should be noted that FIG. 3 is illustrated by omitting descriptions for the hopper 11 and injection cylinder unit 12.

As shown in FIG. 3, the flange 13*b* of the supply unit 13 has a square-ring shape, and the supply unit 13 is fixed to the heat control jacket 14 by four of the bolts 134 being respectively fastened to each of the bolt holes formed in the four corners thereof, and the bolt holes formed in the top face of the heat control jacket 14. In the present embodiment, all of the bolt holes are arranged on the same circumference (on the circumference of circle C in FIG. 3); therefore, it becomes possible to pivot the supply unit 13 in 90 degree increments around the X2 axis (vertical axis) and fix with the bolts. As shown in FIG. 3, the position and orientation of the opening 132 on the hopper side of the supply hole 131 thereby assume different positions and orientations rotated in 90 degree increments around the X2 axis (vertical axis). In other words, the supply direction of molding material is changeable to switch to the E direction (state on upper left in FIG. 3), S direction (obliquely downwards to left in FIG. 1, state on lower right in FIG. 3), W direction (state on upper right in FIG. 3) and N direction (obliquely downwards to right in FIG. 1, state on lower left in FIG. 3), which are four different directions made by rotating by 90 degree increments around the X2 axis (vertical axis).

The following effects are exerted according to the present embodiment.

In the injection device 1 according to the present embodiment, the supply unit 13, in which the supply hole 131 for supplying the molding material stored in the hopper 11 into the injection cylinder unit 12 is formed thereinside, is fixed so that the position and orientation of the opening 132 on the hopper side of the supply hole 131 becomes changeable relative to the injection cylinder unit 12. In more detail, the supply unit 13 is fixed so as to be pivotable step-wise (4 steps) around the X2 axis (vertical axis).

Since it is thereby possible to change the supply direction of molding material step-wise (4 steps), it is possible to provide an injection device with high convenience by the degrees of freedom in layout of the storage unit such as the hopper 11 and the peripheral equipment increasing. In other words, a layout with more freedom according to the purpose of the molding operator is possible, and by arranging the storage unit such as the hopper 11 to bias to a position displaced in a horizontal direction orthogonal to the Y axis, which is the central axis of the injection cylinder unit 12 in order to change the supply direction of the molding material to the E direction or W direction, for example, an operator easily approaches the storage unit from outside of the device, and thus refilling of molding material is facilitated. In addition, since it is possible to ensure a wide space on the opposite side to the side to which the storage unit is biased, it is possible to ensure the installation space for peripheral device such as a retrieving robot is wide.

Second Embodiment

Figure 4:
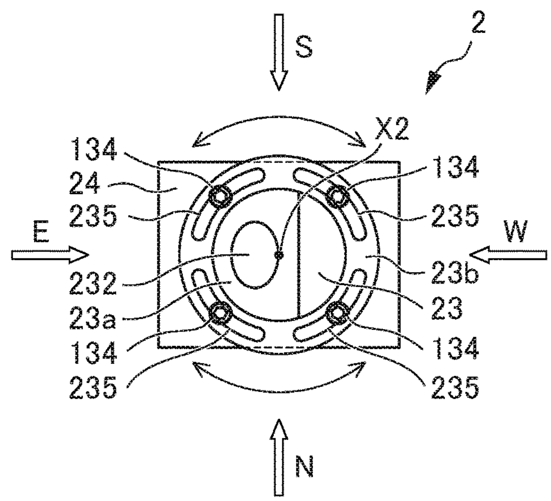
FIG. 4 is a view illustrating a configuration of an injection device according to a second embodiment and a changing operation of the supply direction of molding material.

FIG. 4 is a view illustrating the configuration of an injection device 2 according to a second embodiment and a changing operation of the supply direction of molding material. It should be noted that FIG. 4 is illustrated by omitting descriptions for the hopper 11 and injection cylinder unit 12.

Regarding the injection device 2 according to the second embodiment as shown in FIG. 4, except for the configuration of the supply unit 23 and the positions of the bolt holes in the top face of the heat control jacket 24 differing compared to the injection device 1 according to the first embodiment, both are the same configuration.

The supply unit 23 of the injection device 2 has a substantially columnar shape, and has, at the upper part thereof, an oblique face part 23*a* connected to a flange 113*a* at a bottom end of the leg 113 of the hopper 11. In addition, the supply unit 23 has an annular flange 23*b* at the lower part thereof. A supply hole similar to the supply unit 13 of the first embodiment is formed inside of the supply unit 23.

As bolt holes, four arc-shaped elongated holes 235 extending in a circumferential direction are formed in the annular flange 23*b* as bolt holes. The four elongated holes 235 are arranged at equal intervals in the circumferential direction. By the bolts 134 respectively being inserted into each of these four elongated holes 235, and being fasted to the bolt holes in the top face of the heat control jacket 24, the supply unit 23 comes to be fixed.

In the injection device 2 equipped with the above configuration, the supply unit 23 is fixed to the heat control jacket 24 to be able to pivot with the X2 axis (vertical axis) as the pivot axis, similarly to the first embodiment. In other words, the position and orientation of the opening 232 on the hopper side of the supply hole formed in the supply unit 23 are changed relative to the injection cylinder unit 12, by removing the bolt 134, temporarily detaching the supply unit 23 from the heat control jacket 24, pivoting around the X2 axis (vertical axis), and then fixing again by the bolt 134. In addition, in the case of the pivot angle being small, specifically i.e. in the case of being less than the central angle of the arc-shaped elongated hole 235, it may be pivoted in a state loosening the bolts 134, without detaching the supply unit 23 from the heat control jacket 24. In this way, the injection device 2 thereby becomes able to seamlessly change the supply direction of molding material.

The following effects are exerted according to the present embodiment.

In the injection device 2 according to the present embodiment, the supply unit 23 is fixed so as to be pivotable seamlessly relative to the injection cylinder unit 12.

Since it is thereby possible to seamlessly change the supply direction of the molding material, it is possible to provide an injection device with higher convenience by the degrees of freedom in layout of the storage unit such as the hopper 11 and the peripheral equipment further increasing. In addition, in the case of the pivot angle being small, i.e. if less than the central angle of the arc-shaped elongated hole 235, it is possible to make pivot without detaching the supply unit 23 from the heat control jacket 14. For this reason, as a result of the supply unit 23 itself functioning as a safety member, it is possible to reliably avoid a situation in which the finger of an operator is mistakenly involved into the rotating screw 122, and thus the operational safety improves.

Third Embodiment

Figure 5:
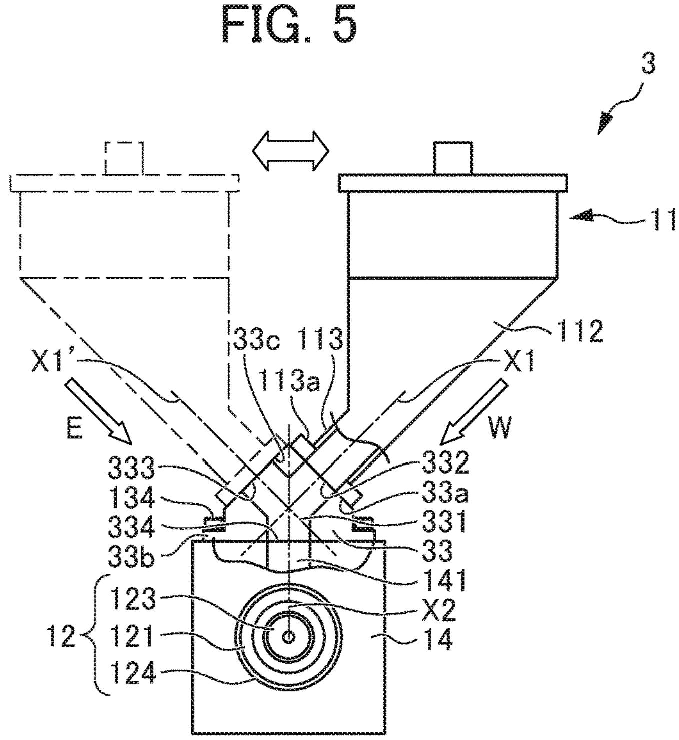
FIG. 5 is a view illustrating a configuration of an injection device according to a third embodiment and a changing operation of the supply direction of molding material.

FIG. 5 is a view illustrating the configuration of an injection device 3 according to a third embodiment and a changing operation of the supply direction of molding material. More specifically, FIG. 5 is a view when looking at the injection device 3 from a leading end side of the injection cylinder unit 12.

For the injection device 3 according to the third embodiment as shown in FIG. 5, except for the configuration of the supply unit 33 differing compared to the injection device 1 according to the first embodiment, both are the same configuration.

More specifically, they differ in the point of only one oblique face part 13*a* being formed at the upper part in the supply unit 13 of the first embodiment; whereas, the supply unit 33 of the injection device 3 has a pair of oblique face parts 33*a*, 33*c* formed at the upper part thereof.

In addition, the supply hole 331 formed inside of the supply unit 33 of the injection device 3 differs from the supply hole 131 of the supply unit 13 of the first embodiment in the point of branching in the middle and having three openings. In more detail, the supply hole 331 branches into a portion extending obliquely downwards from an opening 332 formed in the oblique face part 33*a*, and a portion extending obliquely downwards from an opening 333 formed in the oblique face part 33*c*, and extends vertically downwards from this branch part to reach an opening 334 on the side of the heat control jacket.

In the present embodiment, the X1 axis, which is the central axis of a portion extending obliquely downwards from the opening 332 formed in the oblique face part 33*a*, and the X1' axis, which is the central axis of a portion extending obliquely downwards from the opening 333 formed in the oblique face part 33*c*, are orthogonal to each other, and intersect with the X2 axis (vertical axis), which is the central axis of a portion extending vertically downwards at the orthogonal point. However, it is not limited thereto, and the central axes may deviate from each other.

As shown in FIG. 5, the supply unit 33 of the present embodiment has the two of the oblique face parts 33*a*, 33*c* functioning as connecting face parts with the hopper 111; therefore, it becomes possible to switch the mounting position of the hopper 11 between the two. The position and orientation of the opening on the hopper side of the supply hole 331 is thereby changed relative to the injection cylinder unit 12, and thus the supply direction of molding material becomes changeable. In other words, the supply direction of molding material is made changeable by switching between the W direction (obliquely downwards to left in FIG. 5) and E direction (obliquely downwards to right in FIG. 5), as shown in FIG. 5.

The following effects are exerted according to the present embodiment.

The injection device 3 according to the present embodiment forms the supply hole 331 that branches in the middle to have the three openings 332, 333, 334 inside of the supply unit 33, as well as forming the two oblique face parts 33*a*, 33*c* at the upper part of the supply unit 33, and arranging the openings 332, 333 in these oblique face parts 33*a*, 33*c*.

Since it is thereby possible to switch the supply direction of molding material between the W direction (obliquely downwards to left in FIG. 5) and E direction (obliquely downwards to right in FIG. 5), similar effects as the first embodiment are exerted. It should be noted that a lid may be provided for the opening on a side not used; however, it is possible to use as a supply port of other materials or additives (gases, liquids, solids). Alternatively, it can also be used as a waste vent of molding material that has become surplus.

Fourth Embodiment

Figure 6A:
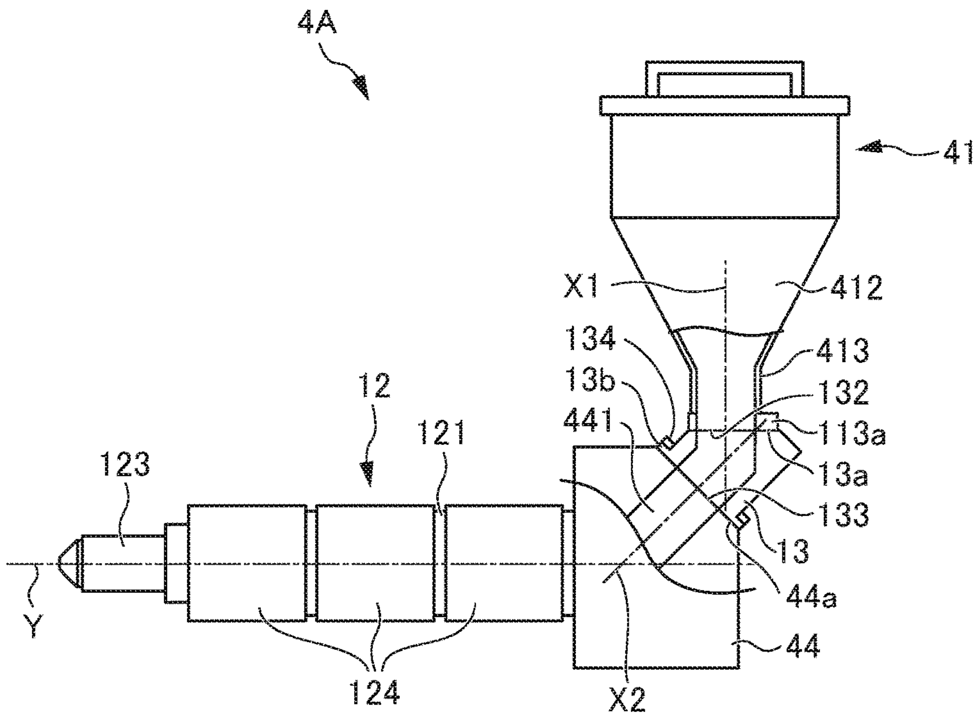
FIG. 6A is a view showing the configuration of an injection device according to a fourth embodiment.

FIG. 6A is a view showing the configuration of an injection device 4A according to a fourth embodiment. For the injection device 4A according to the fourth embodiment as shown in FIG. 6A, except for the configuration of the hopper 41 and the configuration of the heat control jacket 44 differing compared to the injection device 1 according to the first embodiment, both are the same configuration.

In the hopper 41, the lower part 112 of inverted oblique cone shape of the hopper 11 of the first embodiment is changed to a lower part 412 of inverted cone shape without eccentricity. In addition, in the hopper 41, the leg part 113 extending obliquely downwards of the hopper 11 of the first embodiment is changed to a leg part 413 extending vertically downwards. In other words, the molding material naturally falls vertically downwards with the hopper 41 of the present embodiment.

In the heat control jacket 14 of the first embodiment, the supply unit 13 is installed and fixed to an upper face thereof; whereas, in the heat control jacket 44 of the present embodiment, an oblique face part 44*a* is formed at an upper part on an opposite side to the side of the injection cylinder unit 12, and the supply unit 13 is obliquely installed and fixed to this oblique face part 44*a*. For this reason, the introducing hole 441 formed inside of the heat control jacket 44 becomes a configuration obliquely extending in the X2 axis direction.

Figure 6B:
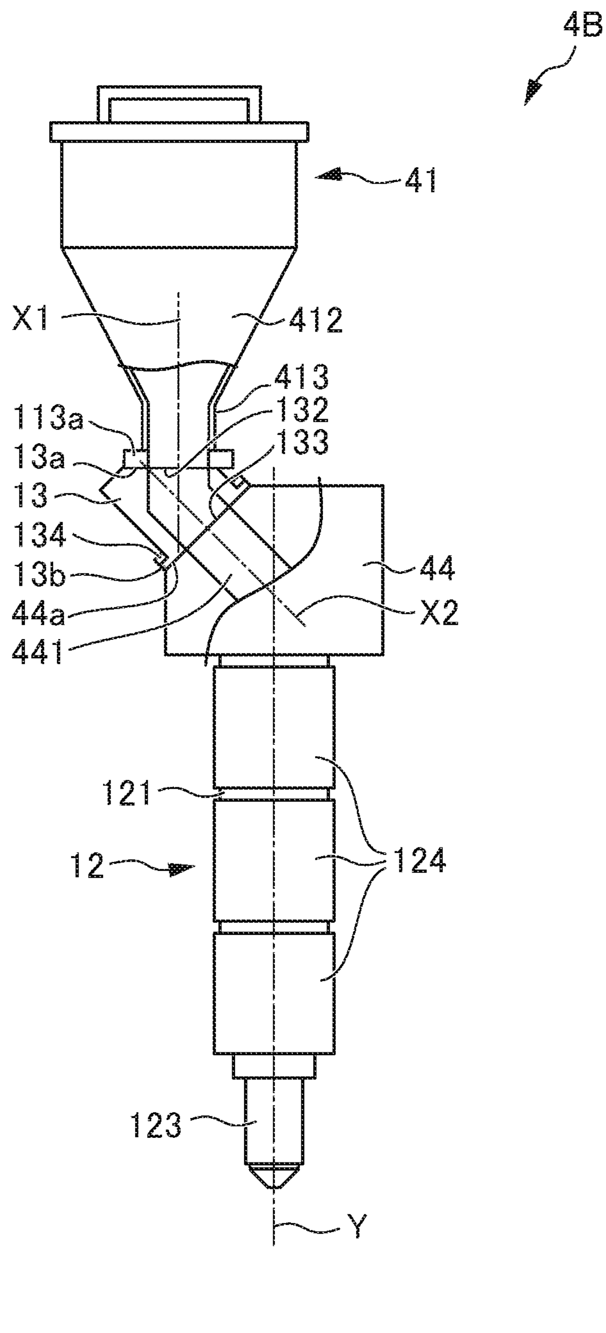
FIG. 6B is a view showing the configuration of an injection device according to a modified example of the fourth embodiment.

Herein, FIG. 6B is a view showing the configuration of an injection device 4B according to a modified example of the fourth embodiment. This injection device 4B corresponds to the device made by pivoting the supply unit 13 of the aforementioned injection device 4A by 180 degrees with the X2 axis (central axis of introducing hole 441) as the pivot axis, to change the injection cylinder unit 12 from horizontal type to vertical type. In this way, with the injection device 4A of the present embodiment, switching between a horizontal-type injection device and vertical-type injection device becomes possible by pivoting the supply unit 13 around the X2 axis.

The following effects are exerted according to the present embodiment.

With the injection devices 4A and 4B according to the present embodiment, the hopper 41 is made a configuration that is an inverted cone whereby the molding material naturally falls vertically downwards, and the supply unit 13 having a pivot function is obliquely fixed relative to the heat control jacket 44.

It is thereby possible to change the position and orientation of the opening 132 on the hopper side of the supply hole 131 formed in the supply unit 13, relative to the injection cylinder unit 12, by pivoting the supply unit 13 around the X2 axis, and thus possible to change the supply direction of molding material; therefore, the same effects as the first embodiment are exerted. Additionally, switching between a horizontal-type injection device and a vertical-type injection device becomes possible, and thus an injection device with high convenience applicable as either horizontal type or vertical type is obtained. In addition, by adjusting the fixing angle of the supply unit 13 relative to the heat control jacket 44, for example, it is not limited to horizontal type or vertical type, and it is possible to apply to an injection device in which the injection cylinder unit 12 is arranged to extend in an oblique direction.

Fifth Embodiment

Figure 7A:
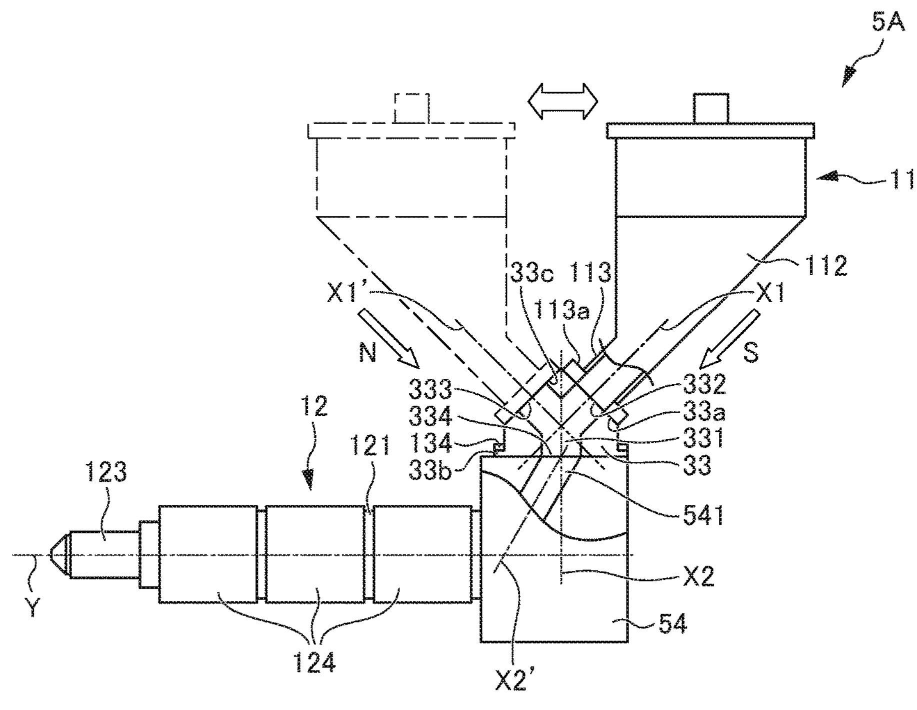
FIG. 7A is a view illustrating the configuration of an injection device according to a fifth embodiment and a changing operation of the supply direction of molding material.

FIG. 7A is a view illustrating the configuration of an injection device 5A according to a fifth embodiment, and a changing operation of the supply direction of molding material. For the injection device 5A according to the fifth embodiment as shown in FIG. 7A, except for the orientation of the supply unit 33 and configuration of the heat control jacket 54 differing compared to the injection device 3 according to the third embodiment, both are the same configuration.

More specifically, the supply unit 33 of the injection device 5A corresponds to one made by pivoting the supply unit 33 of the injection device 3 according to the third embodiment by 90 degrees around the X2 axis (vertical axis) and fixing.

In addition, in the heat control jacket 54, the point of the introducing hole 541 inside thereof being formed to extend obliquely downwards (X2' axis direction in FIG. 7A) from the top face of the heat control jacket 54 differs from the introducing hole 141 of the injection device 3, which extends vertically downwards.

As shown in FIG. 7A, the supply unit 33 of the present embodiment has the two oblique face parts 33*a*, 33*c* functioning as connecting face parts with the hopper 11, similarly to the third embodiment; therefore, it becomes possible to switch the mounting position of the hopper 11 between the two. The position and orientation of the opening on the hopper side of the supply hole 331 are changed relative to the injection cylinder unit 12, and thus the supply direction of the molding material becomes changeable. In other words, in the present embodiment, the supply direction of the molding material becomes changeable by switching between the S direction (obliquely downwards to left in FIG. 7A) and the N direction (obliquely downwards to right in FIG. 7A), as shown in FIG. 7A.

Figure 7B:
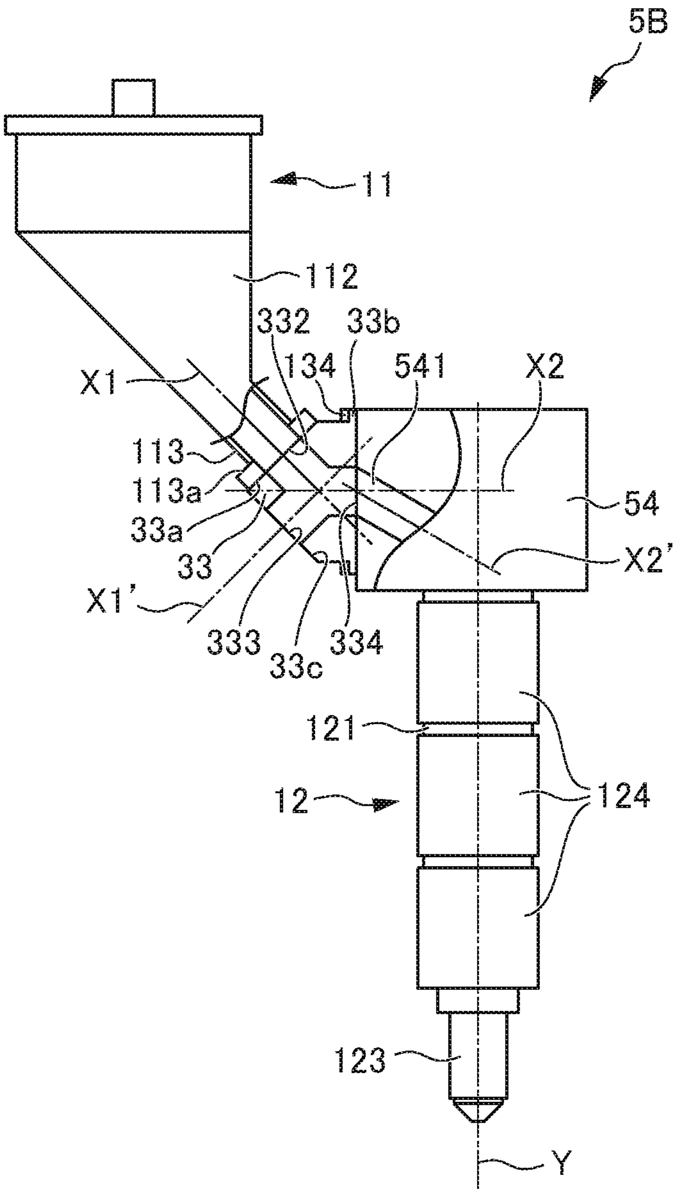
FIG. 7B is a view showing the configuration of an injection device according to a modified example of the fifth embodiment.

Herein, FIG. 7B is a view showing the configuration of an injection device 5B according to a modified example of the fifth embodiment. This injection device 5B corresponds to a device made by pivoting the orientation of the hopper 11 in the aforementioned injection device 5A with the X1 axis (central axis of leg 113) by 180 degrees as the pivot axis, to change the injection cylinder unit 12 from horizontal type to vertical type. In this way, the injection device 5A of the present embodiment pivots the hopper 11 around the X1 axis, whereby switching between a horizontal-type injection device and a vertical-type injection device becomes possible.

Figure 7C:
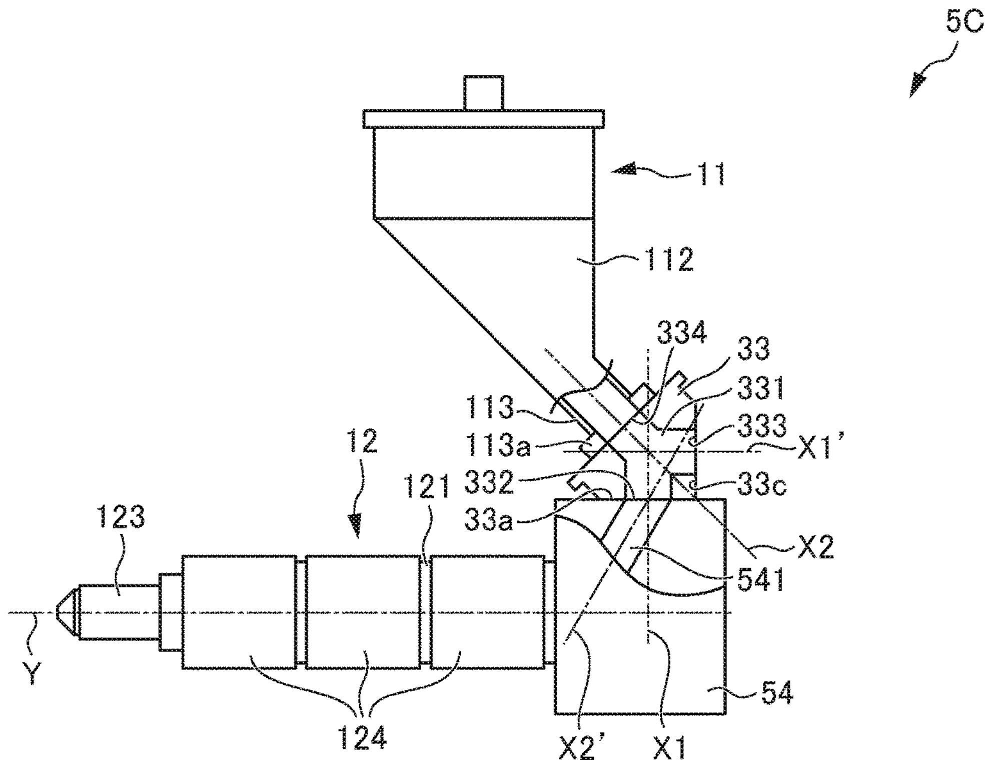
FIG. 7C is a view showing the configuration of an injection device according to a modified example of the fifth embodiment.
Figure 8A:
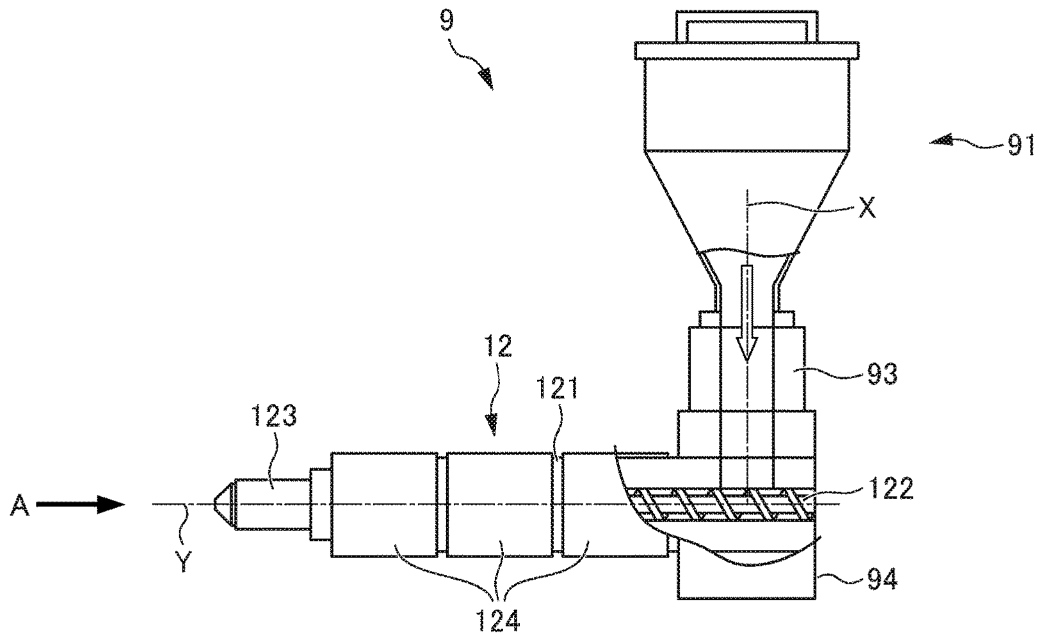
FIG. 8A is a view showing the configuration of a conventional, general injection device.
Figure 8B:
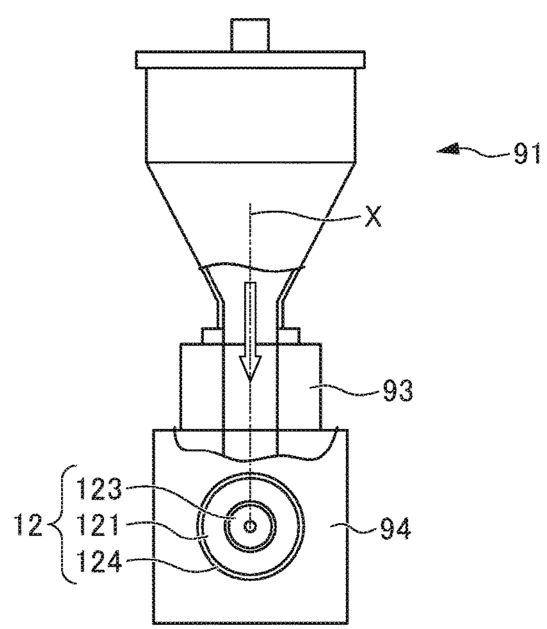
FIG. 8B is a view along the arrow A in FIG. 8A.

In addition, FIG. 7C is a view showing the configuration of an injection device 5C according to a modified example of the fifth embodiment. The injection device 5C corresponds to a device made by pivoting the supply unit 33 with the horizontal direction orthogonal to the Y axis, which is the central axis of the injection cylinder unit 12 (direction orthogonal to FIG. 7A sheet plane) as the pivot axis, as well as connecting the opening 332 to the introducing hole 541 of the heat control jacket 54, and connecting the opening 334 to the hopper 11, in the aforementioned injection device 5A. In this way, in the injection device 5C of the present embodiment pivots, changing of the supply direction of the molding material becomes possible, by pivoting the supply unit 33 with the horizontal direction, which is orthogonal to the Y axis that is the central axis of the injection cylinder 12, as the pivot axis.

The following effects are exerted according to the present embodiment.

In the injection devices 5A to 5C according to the present embodiment, in addition to the same effects as the third embodiment being exerted by providing the supply unit 33, switching between a horizontal-type injection device and a vertical-type injection device becomes possible by changing the orientation of the hopper 11, and thus an injection device with high convenience that is applicable as either horizontal type or vertical type is obtained.

In addition, with the injection devices 5A to 5C according to the present embodiment, it is possible to change the supply direction of the molding material even by pivoting the supply unit 33 with the horizontal direction orthogonal to the Y axis, which is the central axis of the injection cylinder unit 12, as the pivot axis, and thus it is possible to provide an injection device with higher convenience. It should be noted that a lid may be provided for the opening on a side not used; however, it is possible to use as a supply port of other materials or additives (gases, liquids, solids). Alternatively, it can also be used as a waste vent of molding material that has become surplus.

It should be noted that the present invention is not to be limited to the above-mentioned first embodiment to fifth embodiment, and that modifications and improvements of a scope that can achieve the object of the present invention are also encompassed by the present invention.

In all of the above-mentioned embodiments, although the position and orientation of the opening on the hopper side of the supply hole are configured to be changeable, it is not limited thereto. For example, it may be made a configuration in which only the orientation of the opening on the hopper side of the supply hole is changeable.

In addition, in all of the above-mentioned embodiments, although a hopper that supplies the molding material to the injection cylinder unit by allowing to naturally fall downwards from its own weight is used as a storage unit, it is not limited thereto. For example, a drying device that dries the molding material may be used in place of the hopper. In addition, an automatic conveying device that is connected to a resin tank and has a loader function of automatically conveying the molding material to the supply unit may be used.

Furthermore, in all of the above-mentioned embodiments, although a configuration is made arranging the heat control jacket between the supply unit and the base end side of the injection cylinder unit, it is not limited thereto. For example, the injection cylinder unit and heat control jacket may be integrated to provide a heat control unit having the heat control function in the injection cylinder unit itself.

EXPLANATION OF REFERENCE NUMERALS

1, 2, 3, 4A, 4B, 5A, 5B, 5C injection device

11, 41 hopper (storage unit)

12 injection cylinder unit

13, 23, 33 supply unit

14, 24, 44, 54 heat control jacket (heat control unit)

131, 331 supply hole

132, 232, 332 opening on hopper side (opening on storage unit side)

X2 pivot axis

What is claimed is:

1. An injection device, comprising:

a storage unit that stores a molding material;

an injection cylinder unit that heats the molding material to melt, and then injects the molding material thus melted; and a supply unit having formed inside thereof a supply hole for supplying the molding material stored in the storage unit to the injection cylinder unit, wherein the injection cylinder unit is configured to include a cylinder and a screw arranged concentrically within the cylinder, the supply unit is fixed to be pivotable around a predetermined pivot axis so that at least either of a position and orientation of the storage unit is changeable relative to the injection cylinder unit, and the supply hole branches inside of the supply unit, and has at least three openings.

2. The injection device according to claim 1, wherein at least one of the openings is a waste vent of molding material.

3. The injection device according to claim 1, further comprising a heat controller that is disposed between the supply unit and a base end side of the injection cylinder unit, and controls a temperature of the base end side of the injection cylinder unit.

4. The injection device according to claim 1, wherein the storage unit is provided to a dryer that dries the molding material or an automatic conveyer that automatically conveys the molding material to the supply unit.

5. The injection device according to claim 1, wherein in any orientation or position of the supply hole, the storage unit is configured to supply molding material to the injection cylinder unit.

* * * * *